(12) United States Patent
Liu et al.

(10) Patent No.: US 12,235,892 B2
(45) Date of Patent: Feb. 25, 2025

(54) DATA CLEANING DEVICE, DATA CLEANING METHOD AND FACE VERIFICATION METHOD

(71) Applicant: GUANGDONG OPPO MOBILE TELECOMMUNICATIONS CORP., LTD., Guangdong (CN)

(72) Inventors: Jie Liu, Palo Alto, CA (US); Yang Zhou, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 381 days.

(21) Appl. No.: 17/748,861

(22) Filed: May 19, 2022

(65) Prior Publication Data

US 2022/0335708 A1    Oct. 20, 2022

Related U.S. Application Data

(63) Continuation of application No. PCT/CN2020/130233, filed on Nov. 19, 2020.
(Continued)

(51) Int. Cl.
*G06V 10/74*    (2022.01)
*G06F 16/55*    (2019.01)
(Continued)

(52) U.S. Cl.
CPC .......... *G06F 16/55* (2019.01); *G06F 18/2413* (2023.01); *G06V 10/30* (2022.01);
(Continued)

(58) Field of Classification Search
CPC ... G06F 16/55; G06F 18/2413; G06V 10/454; G06V 40/171; G06V 10/761;
(Continued)

(56) References Cited

U.S. PATENT DOCUMENTS

2016/0125270 A1*  5/2016  Gokturk ............... G06F 18/22
                                                       382/118
2019/0205620 A1*  7/2019  Yi ........................... G06N 3/08

FOREIGN PATENT DOCUMENTS

CN    108319938     7/2018
CN    108875654    11/2018
(Continued)

OTHER PUBLICATIONS

EPO, Extended European Search Report for EP Application No. 20889278.6, Dec. 2, 2022.
(Continued)

*Primary Examiner* — Quang N Vo
(74) *Attorney, Agent, or Firm* — Hodgson Russ LLP

(57) ABSTRACT

A data cleaning method is provided. The method incudes: acquiring a training face dataset, the training face dataset including a plurality of training images each labeled with a person ID; acquiring a candidate face verification model and training the candidate face verification model by the plurality of training images; acquiring a plurality of feature embeddings from the candidate face verification model after training, and determining a similarity between the average feature embedding of one person ID and each image labeled as the same person ID; extracting at least one training image whose similarity is smaller than a similarity threshold from the plurality of training images; and excluding the at least one extracted training image in response to receiving a confirmation signal.

20 Claims, 6 Drawing Sheets

Related U.S. Application Data

(60) Provisional application No. 62/938,246, filed on Nov. 20, 2019.

(51) Int. Cl.
  *G06F 18/2413* (2023.01)
  *G06K 9/62* (2022.01)
  *G06V 10/30* (2022.01)
  *G06V 10/44* (2022.01)
  *G06V 10/774* (2022.01)
  *G06V 10/778* (2022.01)
  *G06V 10/82* (2022.01)
  *G06V 40/16* (2022.01)
  *G06V 40/50* (2022.01)

(52) U.S. Cl.
  CPC .......... *G06V 10/454* (2022.01); *G06V 10/761* (2022.01); *G06V 10/774* (2022.01); *G06V 10/7784* (2022.01); *G06V 10/82* (2022.01); *G06V 40/161* (2022.01); *G06V 40/171* (2022.01); *G06V 40/172* (2022.01); *G06V 40/50* (2022.01)

(58) Field of Classification Search
  CPC ...... G06V 40/172; G06V 10/82; G06V 10/30; G06V 40/161; G06V 10/7784; G06V 10/774; G06V 40/50
  See application file for complete search history.

(56) References Cited

FOREIGN PATENT DOCUMENTS

| | | |
|---|---|---|
| CN | 108921204 | 11/2018 |
| CN | 108932343 | 12/2018 |
| CN | 109034106 | 12/2018 |
| CN | 109086697 | 12/2018 |
| CN | 109241903 | 1/2019 |
| EP | 3361423 | 8/2018 |
| WO | 2012071677 | 6/2012 |

OTHER PUBLICATIONS

Wahab, "Deep Residual Learning: Workshop on Intro to Deep Neural Networks," Pakistan Institute of Engineering & Applied Sciences, Aug. 2016.

Howard et al., "MobileNets: Efficient Convolutional Neural Networks for Mobile Vision Applications," arXiv:1704.04861, Apr. 2017.

WIPO, International Search Report and Written Opinion for International Application No. PCT/CN2020/130233, Feb. 24, 2021.

EPO, Communication for EP Application No. 20889278.6, Oct. 25, 2024.

* cited by examiner

DATA CLEANING DEVICE, DATA CLEANING METHOD AND FACE VERIFICATION METHOD

CROSS REFERENCE TO RELATED APPLICATIONS

This application is a continuation of International Application No. PCT/CN2020/130233, filed Nov. 19, 2020, which claims priority to U.S. Provisional Application No. 62/938, 246, filed Nov. 20, 2019, the entire disclosures of which are incorporated herein by reference.

TECHNICAL FIELD

The present disclosure relates to the field of computer vision technologies, and more particularly, to a data cleaning device, a data cleaning method and a face verification method.

BACKGROUND

As an important technology for identification and discrimination, face recognition has irreplaceable functions in the modern world. For face verification, both false positives and false negatives should be minimized to avoid failures and hacks. Under this circumstance, the quality of the face dataset is very important. However, general face data collections involve inconsistencies because of the unprofessional-ism of the operators and testers, and inaccurate face detection may also lower the performance of face verification. To obtain face recognition with high reliability and accuracy, data needs to be cleaned and processed such that noisy images are ruled out.

Existing data clean pipelines include the manual and model-based cleanings. Nevertheless, manual cleaning needs high volumes of human labors and is not realizable when the number of the face images is huge (over a few million), while model-based cleaning may either clean the data too excessively or still leave too many noises.

SUMMARY

Embodiments of the disclosure provide a data cleaning method. The method incudes: acquiring a training face dataset, the training face dataset including a plurality of training images each labeled with a person ID; acquiring a candidate face verification model and training the candidate face verification model by the plurality of training images; acquiring a plurality of feature embeddings from the candidate face verification model after training, and determining a similarity between the average feature embedding of one person ID and each image labeled as the same person ID; extracting at least one training image whose similarity is smaller than a similarity threshold from the plurality of training images; and excluding the at least one extracted training image in response to receiving a confirmation signal.

Embodiments of the disclosure provide a face verification method. The method includes: providing a training face dataset, the training face dataset including a plurality of training images each labeled with a person ID; acquiring a candidate face verification model and training the candidate face verification model by the plurality of training images; acquiring a plurality of feature embeddings from the candidate face verification model after training, and determining a similarity between the average feature embedding of one person ID and each image labeled as the same person ID; extracting at least one training image whose similarity is smaller than a similarity threshold from the plurality of training images; excluding the at least one extracted training image in response to receiving a confirmation signal and thereby updating the training face dataset; training the candidate face verification model by the updated training face dataset; and performing face verification by the trained candidate face verification model.

Embodiments of the disclosure provide a data cleaning device. The device includes: a processor and a memory coupled to the processor, the memory stores data (e.g., program codes) executable by the processor, and the processor is configured, when executing the data, realize a data cleaning method including: acquiring a training face dataset, the training face dataset including a plurality of training images each labeled with a person ID; training a candidate face verification model by the training face dataset; acquiring a plurality of feature embeddings from the trained candidate face verification model, and determining a similarity between an average feature embedding of one person ID and each train image labeled as the same person ID; extracting at least one training image whose similarity is smaller than a similarity threshold from the plurality of training images; and excluding the at least one extracted training image from the training face dataset in response to receiving a confirmation signal.

BRIEF DESCRIPTION OF THE DRAWINGS

In order to more clearly describe the technical solutions of the disclosure, the following briefly introduces the drawings needed to be used in the description of the embodiments. Obviously, the drawings in the following description only illustrate some embodiments of the disclosure, and other drawings can be obtained for those skilled in the art, based on these drawings without creative work.

DETAILED DESCRIPTION OF PREFERRED EMBODIMENTS

Figure 1:
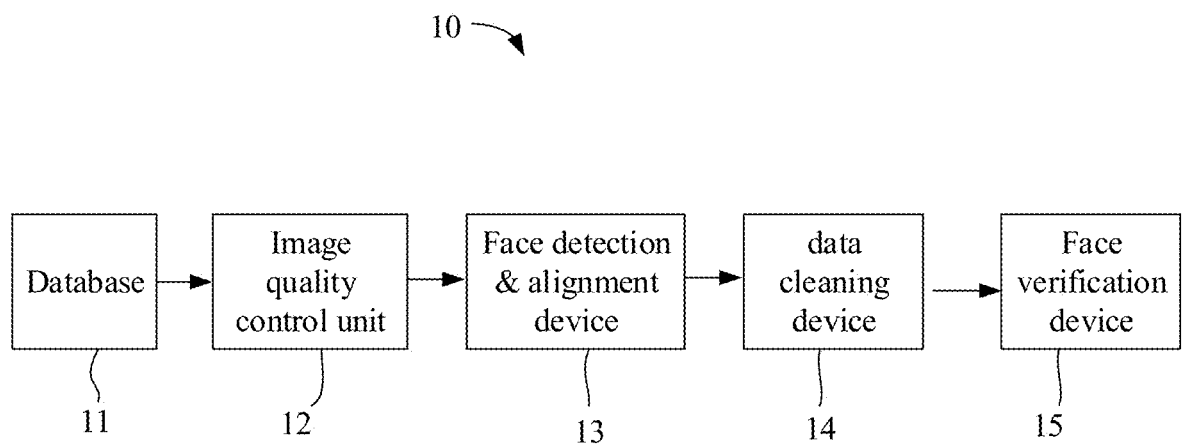
FIG. 1 illustrates a schematic block diagram of a face verification system, according to an embodiment of the disclosure.

The same reference numeral in the drawings represents the same component, and the principle of the disclosure is illustrated by being implemented in an appropriate computing environment for illustration. The following description is based on the exemplified specific embodiments of the disclosure and should not be regarded as limiting other embodiments that are not illustrated herein.

The principle of the disclosure uses many other computation system, communication environments or configurations, with general purpose or specific purpose, to execute. Well-known examples of computing systems, environments, and configurations suitable for use in this disclosure may include (but are not limited to) handheld phones, personal computers, servers, multi-processor systems, microcomputer-based systems, main architecture computers, and distributed computing environments which include any of the above systems or devices.

Details will be described below.

FIG. 1 illustrates a schematic structural diagram of a face verification system 10. The face verification system 10 may include a database 11, an image quality control unit 12, a face detection & alignment device 13, a data cleaning device 14, and a face verification device 15.

The database 11 includes at least one training & testing face dataset. The face dataset includes a plurality of training images, each image includes a human face and is labeled with a corresponding person ID.

Figure 2:
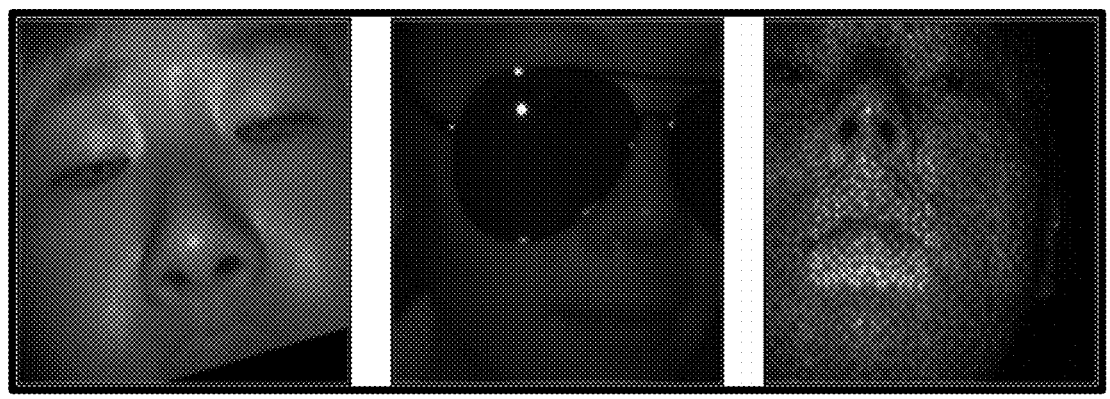
FIG. 2 illustrates a diagram of noisy images.

However, it is noted that there may be more than one noisy images included in the plurality of training images. The human face represented in the noisy images, is blurred, inaccurate, or blocked with a mask or glasses, as illustrated in FIG. 2.

Figure 3:
FIG. 3 illustrates a diagram showing images of the same person are labeled to different person IDs.

It is also should be noted that one person ID may correspond to more than one images, e.g., two or more. There may be two or more images of the same person are labeled to different person IDs, as illustrated in FIG. 3.

The image quality control unit 12 is configured to process the images as required. For example, the image quality control unit is configured to resize, decode, or binarize the input images to generate qualified images in a particular size.

The face detection & alignment device 13 is configured to extract feature maps of the input grayscale image, detect the human face, align the human face, and output data about face detection & alignment result. The output data may include face classification information, face location information, and face feature information. For example, the face classification information may include two dimensions, the first one represents a probability of being a face, the second one represents a probability of not a face. The face location information may be represented as data of bounding box regression, which includes four dimensions, the first one represents an offset of x-coordinate at the upper left corner of a bounding box, the second one represents an offset of y-coordinate at the upper left corner of the bounding box, the third one represents an offset of x-coordinate at the lower right corner of the bounding box, and the fourth one represents an offset of y-coordinate at the lower right corner of the bounding box. The face feature information may include a number of feature maps or a number of feature vectors, for representing face features of the human face.

The data cleaning device 14 is configured to clean noisy images according to actual needs. That is, the noisy images, with blurred, inaccurate, or blocked human face, are removed from the face dataset, thereby improving the accuracy of face verification.

The face verification device 15 is configured to determine whether the input image corresponds to an authorized person for unlocking. That is, the face verification device 15 may acquire sample face images of the authorized person, generate a verification pair including the sample face of the authorized person and the human face detected by the face detection & alignment device 13 and cleaned by the data cleaning device 14, and determine whether it is a positive pair, wherein the positive pair may correspond or respond to an unlocking instruction. When the human face detected by the face detection & alignment device 13 and the sample face are determined belong to the same person, the verification pair is regarded to be positive. When the human face detected by the face detection & alignment device 13 and the sample face are determined not belong to the same person, the verification pair is regarded to be negative. The positive pair may generate or respond to the unlocking instruction, to unlock an electronic device. Meanwhile, the negative pair may fail to generate or respond to the unlocking instruction, and the electronic device may remain locked.

The face verification system 10 may further include a processor and a memory, the processor is configured to perform the verification processes and any other processes, and the memory is configured to store the sample face images and any other data.

In the face verification system 10, the noisy images are removed from the face dataset, therefore the accuracy for face verification can be improved.

Figure 4:
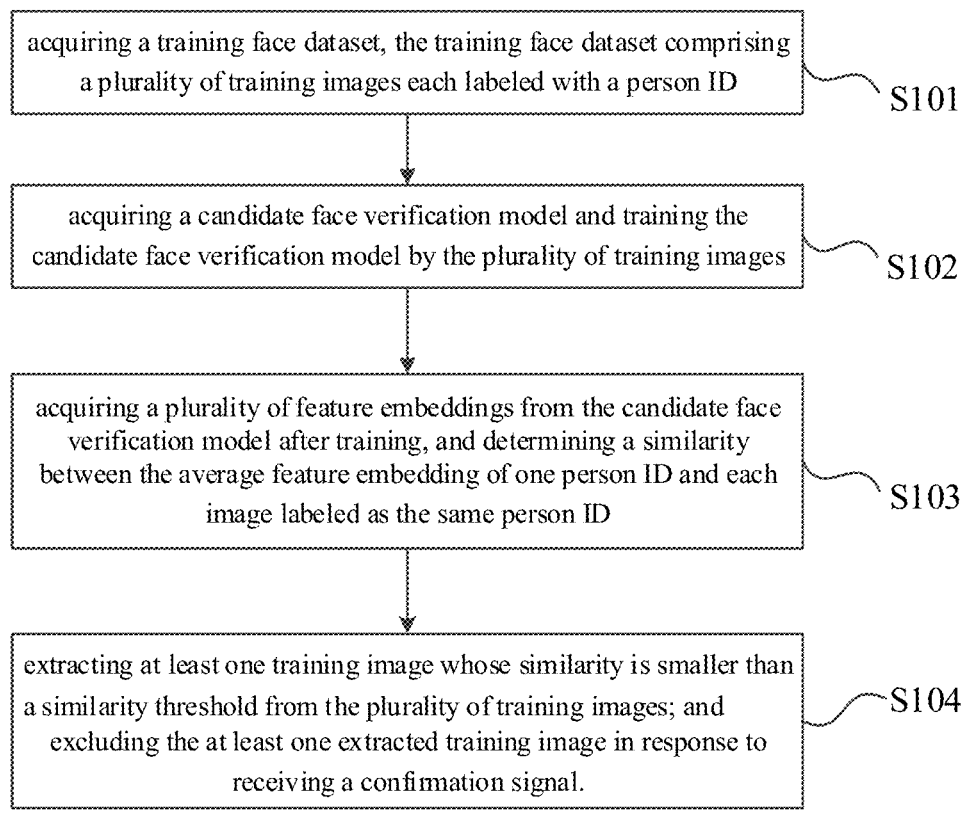
FIG. 4 illustrates a flow char of a data cleaning method, according to an embodiment of the disclosure.

FIG. 4 illustrates a flow chart of a data cleaning method, based on a convolutional neural network for face verification. The data cleaning method may be implemented by the data cleaning device 14 as stated above. The method may begin from block S101 to block S104.

At block S101, a training face dataset is obtained from a face detection device. The training face dataset includes a plurality of training images, each image includes a human face and is labeled with a corresponding person ID. That is, the dataset can be represented as a list, a matrix or vectors. In the embodiment, the training face dataset is obtained from the face detection device, However, it is noted that there may be more than one noisy images included in the plurality of training images. The human face represented in the noisy images, is blurred, inaccurate, or blocked with a mask or glasses, as illustrated in FIG. 2.

It is also should be noted that one person ID may correspond to more than one images, e.g., two or more. There may be two or more images of the same person are labeled to different person IDs, as illustrated in FIG. 3.

In the disclosure, a list for all image data of the face dataset is generated, e.g., "all.lst" is generated for representing the face dataset.

At block S102, a candidate face verification model is acquired and then trained, using the plurality of training images.

The candidate face verification model can be a classification model, selected from a MobileNet model, a ResNet model, an InceptionNet model, and the like. These models are widely used in the field of image classification.

It should be noted that, the candidate face verification model may be the same or different from a face verification model utilized in the face verification device 15 of the face verification system 10.

All images of the dataset, are input into the candidate face verification model, the candidate face verification model runs the images of the dataset with its algorithm and generates corresponding model parameters thereby.

After training, the candidate face verification model generates a plurality of feature embeddings, for every input image. The feature embeddings can be represented in forms of vectors, matrixes or lists. For example, each input image may correspond to a feature embedding vector, and the plurality of training images are corresponding to a plurality of feature embedding vectors.

At block S103, the plurality of feature embeddings are acquired from the candidate face verification model after training. The plurality of feature embeddings correspond to a plurality of person IDs, every person ID may correspond to more than one feature embeddings, the feature embeddings belonged to the same person ID are computed to obtain the average feature embedding of the person ID. The average feature embedding may be represented in the form of a vector.

Then, the average feature embedding of one person ID and every image labeled as the same person is compared, for example, in the form of similarity. The similarity can be represented by cosine similarity, Jaccard similarity coefficient, Pearson Correlation Coefficient, and the like. In the embodiment, the average feature embedding is represented as an average feature embedding vector, the image is represented as an image feature vector, a similarity of the two vectors is represented by the cosine similarity. The cosine similarity of two vectors can be calculated based on the following expression:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}},$$

where A and B represent two vectors respectively.

The two vectors are more similar, the angle between the two vectors is closer to 0, therefore the cosine value is closer to 1.

At block S104, at least one training image whose similarity is smaller than a similarity threshold is extracted from the plurality of training images, the at least one extracted training image is output for checking, and the at least one extracted training image is excluded from the "all.lst" in response to receiving a confirmation signal.

The similarity threshold refers to a limit value, which can be determined or set according to the actual situation. The at least one training image whose similarity is smaller than the limit value is seriously deviated from the average feature embedding, therefore the at least one training image probably is an abnormal and unqualified image. However, a further checking process is required to determine whether the at least one training image is truly abnormal or unqualified. The remaining training images whose similarity is larger than or equal to the limit value are very close to the average feature embedding, therefore these remaining training images are considered to be normal and qualified images.

Specifically, the block of S104 may include actions/operations in the following sub-blocks.

At sub-block S1041, the similarity threshold is defined. The similarity threshold can be determined according to actual requirements. For example, the similarity threshold can be determined as 0.85.

At sub-block S1042, the at least one training image whose similarity is smaller than the similarity threshold is extracted, and an extracted list "noisy.lst" is generated to include the at least one extracted training image. For example, the "all.lst" includes N training images, there are X training images whose similarity is smaller than 0.85, and the X training images are included in the "noisy.lst", where N is greater than X, and X is an integer greater than or equal to 1.

At sub-block S1043, the at least one extracted training image is output external for a further checking.

For example, the X training images included in the "noisy.lst" are output to be displayed on a screen, a checker may visually check the X training images in sequence, determine whether each of the X training images is qualified, and feed back a checking signal for each of the X training images. That is, the checking signal for each of the X training images, is responded by the checker. The checking signal has two kinds, one is the confirmation signal indicating the checked training image is a noisy image, the other one is a rejection signal indicating the checked training image is not a noisy image.

For another example, the X training images are output to a checking device, the checking device automatically check the X training images, determine whether the X training images are qualified, and feed back checking signals of the X training images.

At sub-block S1044, when receiving the confirmation signal of the at least one training image, the at least one extracted training image is excluded from the "all.lst", therefore the "all.lst" is updated, in other words, a new "all.lst" is generated.

For example, the X training images are all confirmed to be noisy images, and the X training images are excluded from the "all.lst", thereby updating the "all.lst". The updated "all.lst" includes N-X training images.

For another example, X-2 training images are confirmed to be noisy images while 2 training images are determined to be not noisy images. The X-2 training images are excluded from the "all.lst", therefore the "all.lst" is updated, and the updated "all.lst" includes N-(X-2) training images.

Figure 5:
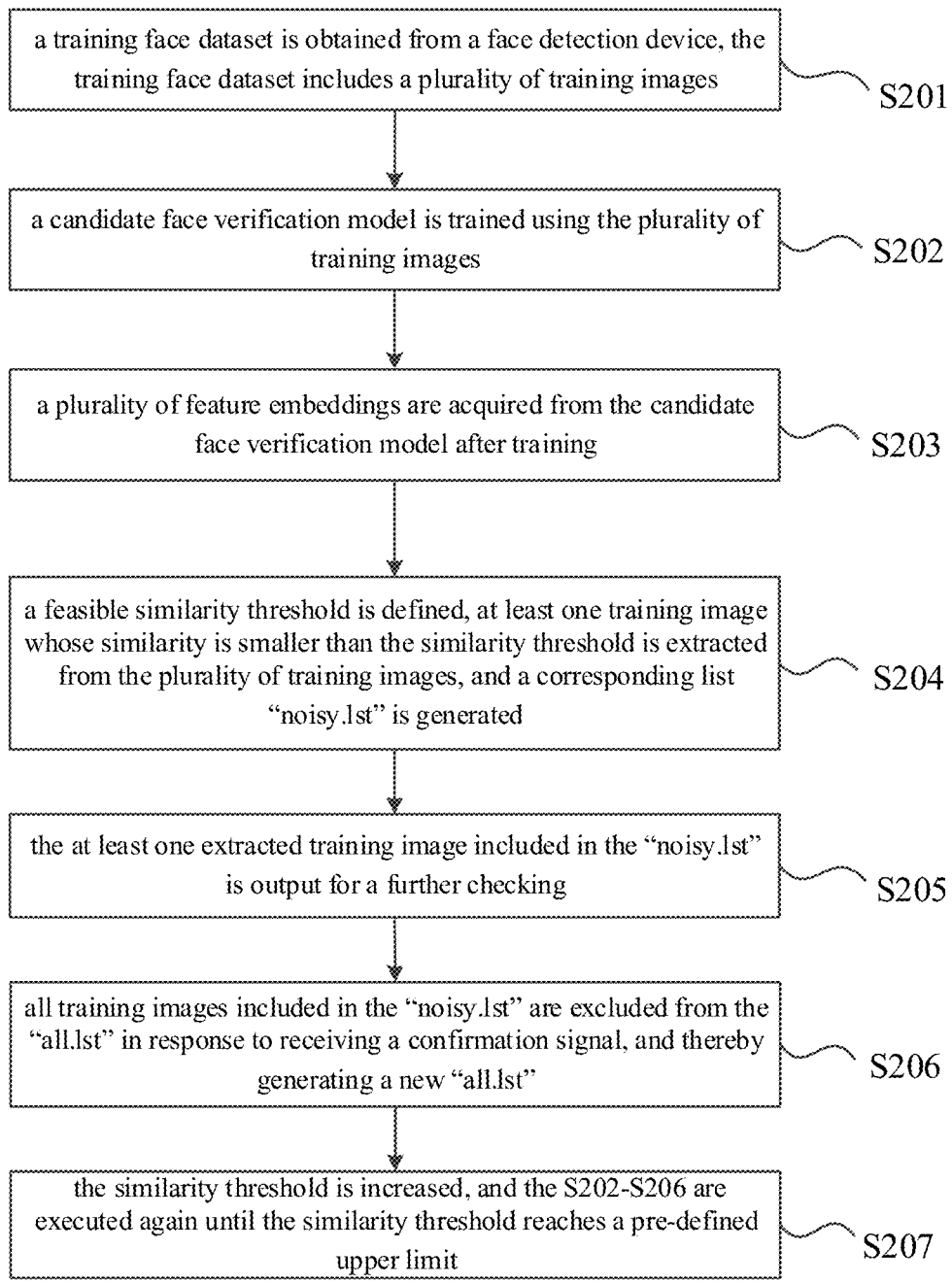
FIG. 5 illustrates a flow char of a data cleaning method, according to another embodiment of the disclosure.

FIG. 5 illustrates a flow chart of a data cleaning method, according to another embodiment of the disclosure. The data cleaning method may be implemented by the data cleaning device 14 as stated above. The method may begin from block S201 to block S207.

At block S201, a training face dataset is obtained from a face detection device. The training face dataset includes a plurality of training images, each image includes a human face and is labeled with a corresponding person ID. The dataset can be represented as a list, a matrix or vectors. In the embodiment, the training face dataset is obtained from the face detection device.

At block S202, a candidate face verification model is trained, using the plurality of training images.

The candidate face verification model can be a classification model, selected from a MobileNet model, a ResNet model, an InceptionNet model, and the like. These models are widely used in the field of image classification.

After training, the candidate face verification model generates a plurality of feature embeddings, for every input image. The feature embeddings can be represented in forms of vectors, matrixes or lists. For example, each input image may correspond to a feature embedding vector, and the plurality of training images are corresponding to a plurality of feature embedding vectors.

At block S203, the plurality of feature embeddings are acquired from the candidate face verification model after training. The plurality of feature embeddings correspond to a plurality of person IDs, every person ID may correspond to more than one feature embeddings, the feature embeddings belonged to the same person ID are computed to obtain the average feature embedding of the person ID. The average feature embedding may be represented in the form of a vector.

Then, the average feature embedding of one person ID and every image labeled as the same person is compared, for example, in the form of similarity. In the embodiment, the average feature embedding is represented as an average feature embedding vector, the image is represented as an image feature vector, a similarity of the two vectors is represented by the cosine similarity. The two vectors are more similar, the angle between the two vectors is closer to 0, therefore the cosine similarity is closer to 1.

At block S204, a feasible similarity threshold is defined, at least one training image whose similarity is smaller than the similarity threshold is extracted from the plurality of training images, and a corresponding list "noisy.lst" is generated to include the at least one extracted training image.

At block S205, the at least one extracted training image included in the "noisy.lst" is output external for a further checking. The further checking process may be executed by a checker or a checking device, for the purpose of identifying whether all training images included in the "noisy.lst" are noisy. When all training image included in the "noisy.lst" are identified to be noisy, S206 is performed next. When not all training image included in the "noisy.lst" are identified to be noisy, the similarity threshold is decreased and then S204 is performed next.

At block S206, all training images included in the "noisy.lst" are excluded from the "all.lst", and thereby generating a new "all.lst".

At block S207, the similarity threshold is increased, and the S202-S206 are executed again until the similarity threshold reaches a pre-defined upper limit, e.g., 0.85. That is, when the similarity threshold reaches the upper limit, the data cleaning method is ended.

In this embodiment, some blocks are executed in a loop until the similarity threshold reaches the upper limit.

Figure 6:
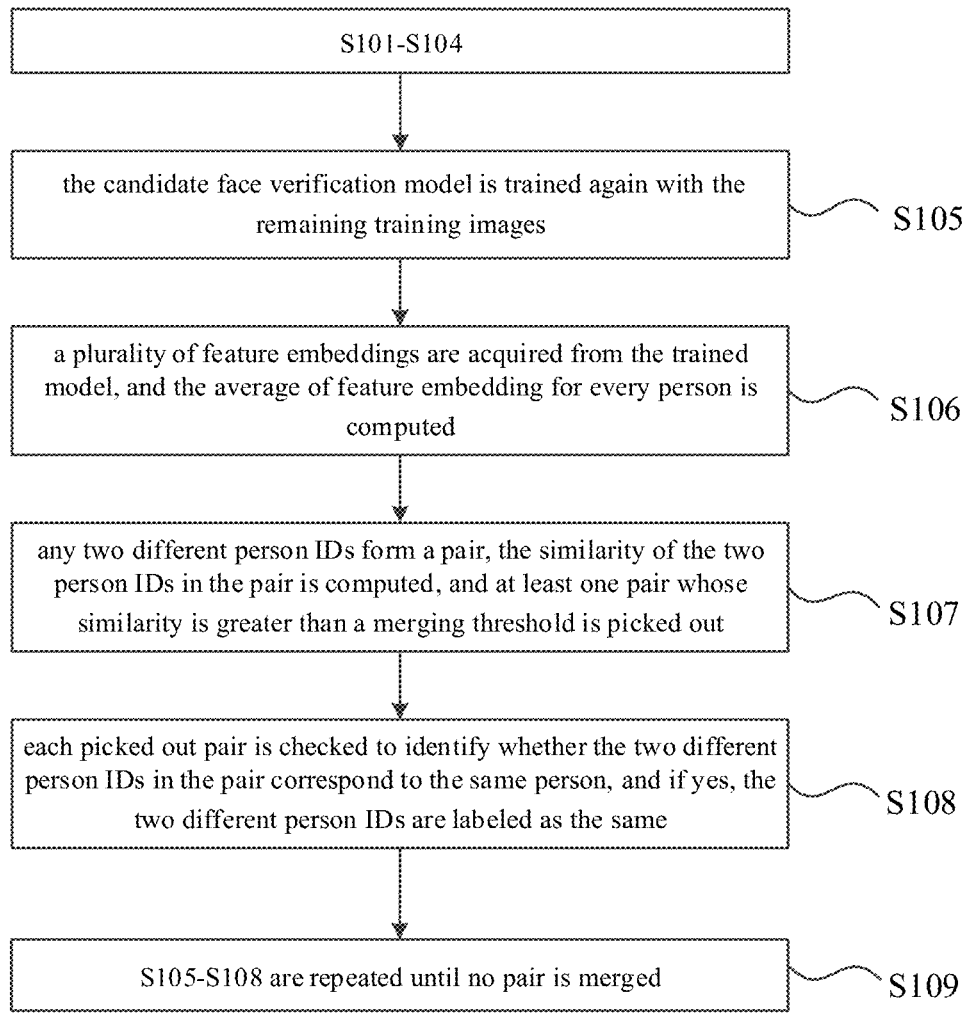
FIG. 6 illustrates a flow char of a data cleaning method, according to still another embodiment of the disclosure.

FIG. 6 illustrates a flow chart of a data cleaning method, according to still another embodiment of the disclosure.

The data cleaning method also includes blocks S101-S104 as shown in FIG. 4 and further includes the following blocks for merging training images labeled as different persons.

At block S105, the candidate face verification model is trained again with the remaining training images, or a new candidate face verification model is trained with the remaining training images.

At block S106, a plurality of feature embeddings are acquired form the trained model, and the average of feature embedding for every person is computed.

At block S107, any two different person IDs form a pair, the similarity of the two person IDs in the pair is computed, and at least one pair whose similarity is greater than a merging threshold is picked out or output.

At block S108, each picked out pair is checked to identify whether the two different person IDs in the pair correspond to the same person, and if yes, the two different person IDs are labeled as the same. In other words, the two different person IDs are merged as one. For example, one of the two person ID is replaced with the other. For another example, a new person ID is generated to replace the two different person IDs.

At block S109, S105-S108 are repeated until no pair is merged.

In the embodiment, the images of the same person labeled as different individual are amended and correctly labeled, thereby decreasing the false negative rate.

Figure 7:
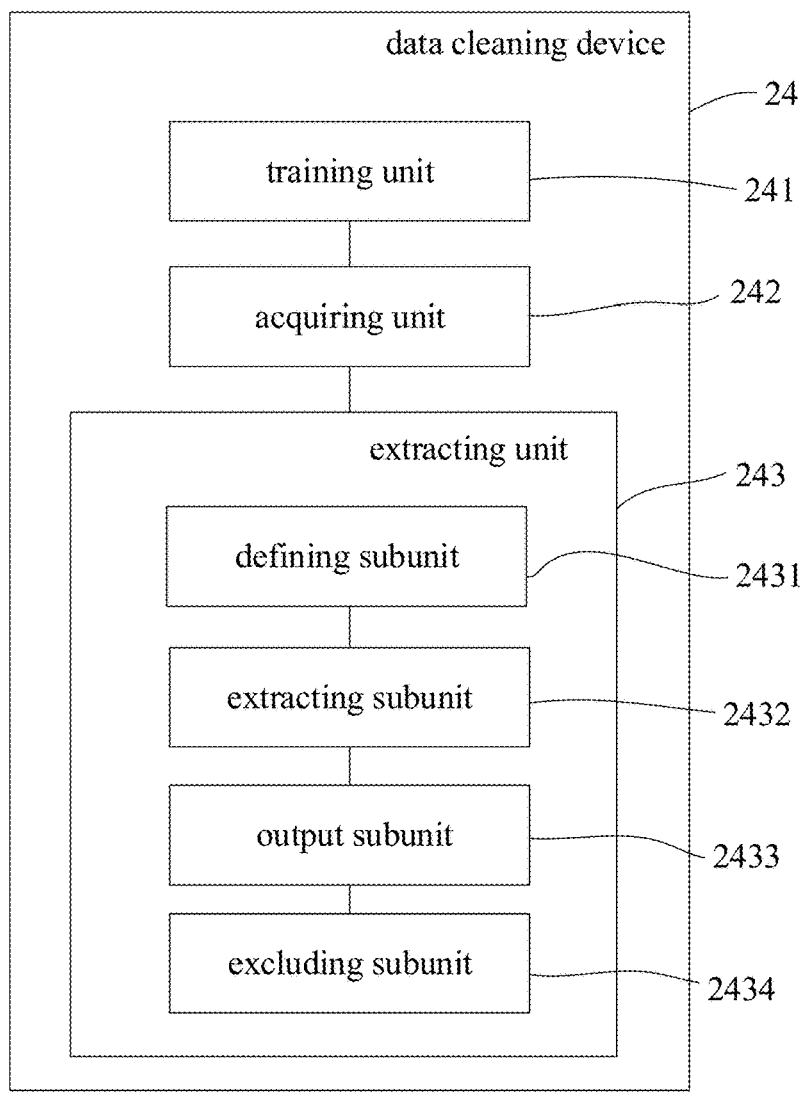
FIG. 7 illustrates a schematic diagram of a data cleaning device, according to an embodiment of the disclosure.

FIG. 7 illustrates a schematic block diagram of a data cleaning device 24, according to an embodiment of the disclosure.

The data cleaning device 24 includes a training unit 241, an acquiring unit 242, and an extracting unit 243. Herein, as an illustrated embodiment, the training unit 241, the acquiring unit 242 and the extracting unit 243 are data e.g., program codes stored in a memory and executable by a processor coupled to the memory; and the data are configured to be executed by the processor to implement a data cleaning method.

Specifically, the training unit 241 is configured for training a candidate face verification model, using a training face dataset. The training face dataset is obtained from a face detection device. The training face dataset includes a plurality of training images, each image includes a human face and is labeled with a corresponding person ID. That is, the dataset can be represented as a list, a matrix or vectors. In the embodiment, the training face dataset is obtained from the face detection device, However, it is noted that there may be more than one noisy images included in the plurality of training images. The human face represented in the noisy images, is blurred, inaccurate, or blocked with a mask or glasses.

It is also should be noted that one person ID may correspond to more than one images, e.g., two or more. There may be two or more images of the same person are labeled to different person IDs.

The candidate face verification model can be a classification model, selected from a MobileNet model, a ResNet model, an InceptionNet model, and the like. These models are widely used in the field of image classification.

All images of the dataset, are input into the candidate face verification model, the candidate face verification model runs the images of the dataset with its algorithm and generates corresponding model parameters thereby.

After training, the candidate face verification model generates a plurality of feature embeddings, for every input image. The feature embeddings can be represented in forms of vectors, matrixes or lists. For example, each input image may correspond to a feature embedding vector, and the plurality of training images are corresponding to a plurality of feature embedding vectors.

The acquiring unit 242 is configured for acquiring the plurality of feature embeddings from the candidate face verification model after training. The plurality of feature embeddings correspond to a plurality of person IDs, every person ID may correspond to more than one feature embeddings, the feature embeddings belonged to the same person ID are computed to obtain the average feature embedding of the person ID. The average feature embedding may be represented in the form of a vector.

Then, the average feature embedding of one person ID and every image labeled as the same person is compared, for example, in the form of similarity. The similarity can be represented by cosine similarity, Jaccard similarity coefficient, Pearson Correlation Coefficient, and the like. In the embodiment, the average feature embedding is represented as an average feature embedding vector, the image is represented as an image feature vector, a similarity of the two vectors is represented by the cosine similarity. The cosine similarity of two vectors can be calculated based on the following expression:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}},$$

where A and B represent two vectors respectively.

The two vectors are more similar, the angle between the two vectors is closer to 0, so the cosine value is closer to 1.

The extracting unit 243 is configured for extracting at least one training image whose similarity is smaller than a similarity threshold from the plurality of training images, the at least one extracted training image is output for checking, and the at least one extracted training image is excluded from the "all.lst" in response to receiving a confirmation signal.

The similarity threshold refers to a limit value, which can be determined or set according to the actual situation. The at least one training image whose similarity is smaller than the limit value is seriously deviated from the average feature embedding, therefore the at least one training image probably is an abnormal and unqualified image. However, a further checking process is required to determine whether the at least one training image is truly abnormal or unqualified. The remaining training images whose similarity is larger than or equal to the limit value are very close to the average feature embedding, therefore these remaining training images are considered to be normal and qualified images.

Specifically, the extracting unit 243 includes the following subunits.

A defining subunit 2431 is configured to define the similarity threshold. The similarity threshold can be determined according to actual requirements. For example, the similarity threshold can be determined as 0.85.

An extracting subunit 2432 is configured to extract the at least one training image whose similarity is smaller than the similarity threshold, and generate an extracted list "noisy.lst" to include the at least one extracted training image. For example, the "all.lst" includes N training images, there are X training images whose similarity is smaller than 0.85, and the X training images are included in the "noisy.lst", where N is greater than X, and X is an integer greater than or equal to 1.

An output subunit 2433 is configured for output the at least one extracted training image to the external for a further checking.

For example, the X training images included in the "noisy.lst" are output to be displayed on a screen, a checker may visually check the X training images in sequence, determine whether each of the X training images is qualified, and feed back a checking signal for each of the X training images. That is, the checking signal for each of the X training images, is responded by the checker. The checking signal has two kinds, one is the confirmation signal indicating the checked training image is a noisy image, the other one is a rejection signal indicating the checked training image is not a noisy image.

For another example, the X training images are output to a checking device, the checking device automatically check the X training images, determine whether the X training images are qualified, and feed back checking signals of the X training images.

An excluding subunit 2434 is configured to exclude the at least one extracted training image from the "all.lst", in response to receiving the confirmation signal of the at least one training image. Therefore, the "all.lst" is updated, in other words, a new "all.lst" is generated.

Figure 8:
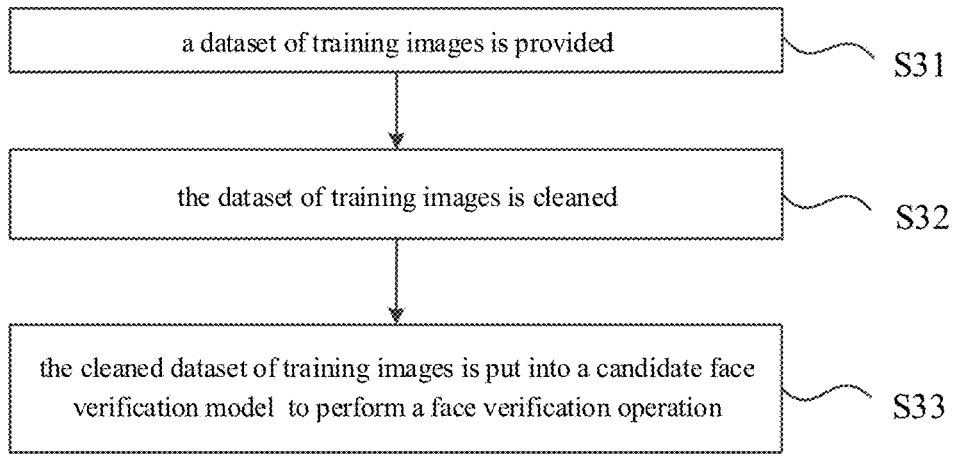
FIG. 8 illustrates a flow chart of a face verification method, according to an embodiment of the disclosure.

FIG. 8 illustrates a flow char of a face verification method, according to an embodiment of the disclosure. The face verification method may begin from block S31 to block S33.

At block S31, a dataset of training images is provided.

At block S32, the dataset of training images is cleaned. The dataset of training images can be cleaned according to the foregoing embodiments.

At block S33, the cleaned dataset of training images is put into the candidate face verification model or another face verification model to perform a face verification operation.

Figure 9A:
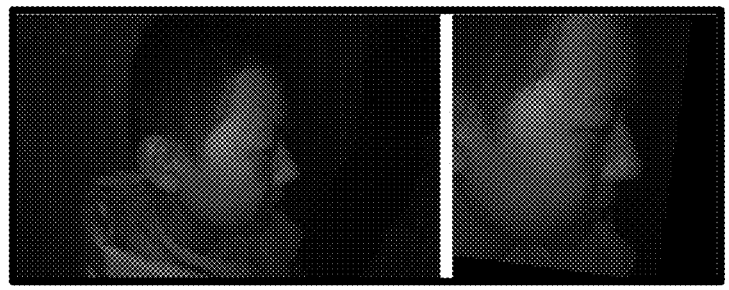
FIG. 9A-9D illustrate diagrams showing removed noisy images in practical verification of the disclosure.
Figure 9B:
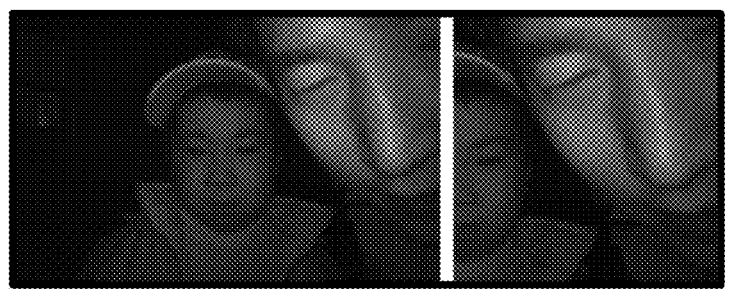
Figure 9C:
Figure 9D:
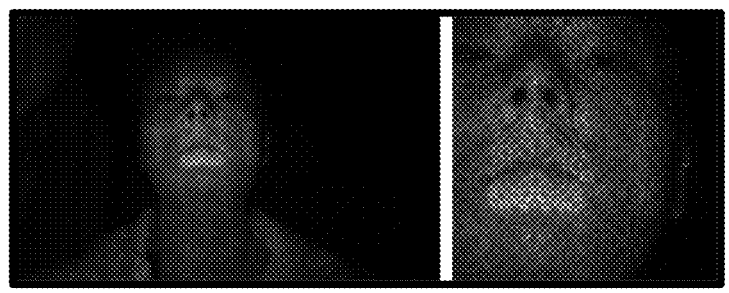

In the practical verification of the disclosure, 0.55% of the total 1752241 training images are confirmed to be noisy images and removed from the dataset of training images. The noisy images can be mainly generalized as four classes, i.e., large pose as shown in FIG. 9A, wrong detection as shown in FIG. 9B, mask as shown in FIG. 9C, and bad image as shown in FIG. 9D. There are 9570 noisy images excluded from the dataset.

In addition, 0.28% of the total person IDs are deleted (merged into others).

The data cleaning method only removes noisy images and eliminates the errors raised by the noises in each individual. The number of the false negatives will remain roughly the same, while on the other hand the false positive cases will be largely reduced. On the contrary, data merge will correct the cases where images of same person are labeled as different individuals, thus decrease the false negative rate. The two advantages of the disclosure should complement each other and improve the overall performance measure. The following table exhibits an obvious performance improvement after data cleaning.

| performance | millionth | One hundred thousandth | One ten thousandth | One thousandth | One percent |
| --- | --- | --- | --- | --- | --- |
| Before data cleaning | 0.9620 | 0.9800 | 0.9850 | 0.9880 | 0.9890 |
| After data cleaning | 0.9711 | 0.9814 | 0.9861 | 0.9880 | 0.9890 |

Specific examples are used in this article to illustrate the principle and implementation of the disclosure, and the description of the above examples is only used to help understand the disclosure. Meanwhile, for those skilled in the art, according to the spirit of the application, there will be changes in the specific implementation and the scope of disclosure. In summary, the content of this specification should not be construed as a limitation to the disclosure.

What is claimed is:

1. A data cleaning method, comprising:
    acquiring a training face dataset, the training face dataset comprising a plurality of training images each labeled with a person identity (ID);
    acquiring a candidate face verification model and training the candidate face verification model by the plurality of training images;

acquiring a plurality of feature embeddings from the candidate face verification model after the training, and determining a similarity between an average feature embedding of one person ID and each image labeled as a same person ID;

extracting at least one training image whose the similarity is smaller than a similarity threshold from the plurality of training images; and excluding the at least one extracted training image in response to receiving a confirmation signal.

2. The method of claim 1, before the operation of excluding the at least one extracted training image and after the operation of extracting at least one training image, the method further comprising:

outputting the at least one extracted training image for a first checking.

3. The method of claim 2, wherein the operation of excluding the at least one extracted training image comprises:

receiving a first checking signal, wherein the first checking signal is one of the confirmation signal and a rejection signal;

excluding the at least one extracted training image in response to receiving the confirmation signal; remaining the at least one extracted training image in response to receiving the rejection signal.

4. The method of claim 1, before the operation of extracting at least one training image, the method further comprising:

defining the similarity threshold less than or equal to an upper limit.

5. The method of claim 4, wherein the upper limit is 0.85.

6. The method of claim 1, after the operation of acquiring a training face dataset, the method further comprising:

generating a list "all.lst" for the plurality of training images;

after the operation of extracting at least one training image, the method further comprising:

generating a list "noisy.lst" for the at least one extracted training image;

after the operation of excluding the at least one extracted training image, the method further comprising:

updating the list "all.lst".

7. The method of claim 1, further comprising:

training the candidate face verification model with the remaining training images;

acquiring a plurality of feature embeddings after the operation of training the candidate face verification model with the remaining training images;

forming a plurality of pairs each comprising two different person IDs;

computing a similarity for each of the plurality of pairs;

extracting at least one pair whose the computed similarity is greater than a merging threshold from the plurality of pairs; and processing, based on a second checking signal, the at least one extracted pair.

8. The method of claim 7, after the operation of extracting at least one pair whose the computed similarity is greater than a merging threshold, the method comprising:

outputting the at least one extracted pair; and receiving the second checking signal configured to process the at least one extracted pair.

9. The method of claim 7, wherein the second checking signal is one of a merging signal and a non-merging signal, the operation of processing, based on a second checking signal, the at least one extracted pair comprises:

amending at least one person ID of the pair in response to receiving the merging signal;

remaining the two different person IDs of the pair in response to receiving the non-merging signal.

10. The method of claim 9, wherein the operation of amending at least one person ID of the pair comprises:

replacing one of the two different person IDs with the other.

11. The method of claim 1, after the operation of excluding the at least one extracted training image, the method further comprising:

increasing the similarity threshold and performing an operation of extracting at least one training image whose the similarity is smaller than the increased similarity threshold from the plurality of training images.

12. A face verification method, comprising:

providing a training face dataset, the training face dataset comprising a plurality of training images each labeled with a person ID;

acquiring a candidate face verification model and training the candidate face verification model by the plurality of training images;

acquiring a plurality of feature embeddings from the candidate face verification model after the training, and determining a similarity between an average feature embedding of one person ID and each image labeled as a same person ID;

extracting at least one training image whose the similarity is smaller than a similarity threshold from the plurality of training images;

excluding the at least one extracted training image in response to receiving a confirmation signal and thereby updating the training face dataset;

training the candidate face verification model by the updated training face dataset; and performing face verification by the trained candidate face verification model.

13. The method of claim 12, before the operation of excluding the at least one extracted training image and after the operation of extracting at least one training image, the method further comprising:

outputting the at least one extracted training image for a first checking.

14. The method of claim 13, wherein the operation of excluding the at least one extracted training image comprises:

receiving a first checking signal, wherein the first checking signal is one of the confirmation signal and a rejection signal;

excluding the at least one extracted training image in response to receiving the confirmation signal; remaining the at least one extracted training image in response to receiving the rejection signal.

15. The method of claim 12, before the operation of extracting at least one training image, the method further comprising:

defining the similarity threshold less than or equal to an upper limit.

16. The method of claim 12, after the operation of acquiring a training face dataset, the method further comprising:

generating a list "all.lst" for the plurality of training images;

after the operation of extracting at least one training image, the method further comprising:

generating a list "noisy.lst" for the at least one extracted training image;
after the operation of excluding the at least one extracted training image, the method further comprising:
updating the list "all.1st".

17. The method of claim 12, after the operation of excluding the at least one extracted training image, the method further comprising:
increasing the similarity threshold and performing an operation of extracting at least one training image whose the similarity is smaller than the increased similarity threshold from the plurality of training images.

18. The method of claim 12, after the operation of excluding the at least one extracted training image and before the operation of training the candidate face verification model by the updated training face dataset, the method further comprising:
training the candidate face verification model with the remaining training images;
acquiring a plurality of feature embeddings after the operation of training the candidate face verification model with the remaining training images;
forming a plurality of pairs each comprising two different person IDs;
computing a similarity for each of the plurality of pairs;
extracting at least one pair whose the computed similarity is greater than a merging threshold from the plurality of pairs; and
processing, based on a second checking signal, the at least one extracted pair.

19. The method of claim 18, after the operation of extracting at least one pair whose the computed similarity is greater than a merging threshold, the method comprising:
outputting the at least one extracted pair; and
receiving the second checking signal configured to process the at least one extracted pair.

20. A data cleaning device, comprising:
a processor and a memory coupled to the processor, wherein the memory stores data executable by the processor, and the processor is configured to, when executing the data, realize a data cleaning method comprising:
acquiring a training face dataset, the training face dataset comprising a plurality of training images each labeled with a person ID;
training a candidate face verification model by the training face dataset;
acquiring a plurality of feature embeddings from the trained candidate face verification model, and determining a similarity between an average feature embedding of one person ID and each train image labeled as the same person ID;
extracting at least one training image whose the similarity is smaller than a similarity threshold from the plurality of training images; and
excluding the at least one extracted training image from the training face dataset in response to receiving a confirmation signal.

* * * * *